United States Patent [19]

Gordon

[11] Patent Number: 5,005,522

[45] Date of Patent: Apr. 9, 1991

[54] TAB FOR ANIMAL TANK COVER

[76] Inventor: Richard A. Gordon, 95 W. 3rd St., Freeport, N.Y. 11520

[21] Appl. No.: 534,443

[22] Filed: Jun. 7, 1990

[51] Int. Cl.⁵ .................................... A01K 63/00
[52] U.S. Cl. ............................................... 119/5
[58] Field of Search ............................................. 119/5

[56] References Cited

U.S. PATENT DOCUMENTS

| | | | |
|---|---|---|---|
| 3,487,935 | 1/1970 | Lovitz | 119/5 |
| 3,730,138 | 5/1973 | Suchowski | 119/5 |
| 3,857,366 | 12/1974 | Willinger | 119/5 |
| 4,272,672 | 6/1981 | Goldman et al. | 119/5 |
| 4,576,115 | 3/1986 | Gordon | 119/5 |

Primary Examiner—Paul J. Hirsch
Attorney, Agent, or Firm—Bauer & Schaffer

[57] ABSTRACT

A cover for a rimmed animal or fish tank is provided with a frame having a plurality of fixed depending retaining clips and removable retaining clips. The removable retaining clips are provided with an inwardly directed shaped flange at its lower end adapted to engage the wall of the tank below the rim to cause the fixed retaining clips to be biased in resilient engagement with the tank wall to secure the cover on the tank by shoulders formed on the front and rear surfaces of the retaining clip.

6 Claims, 1 Drawing Sheet

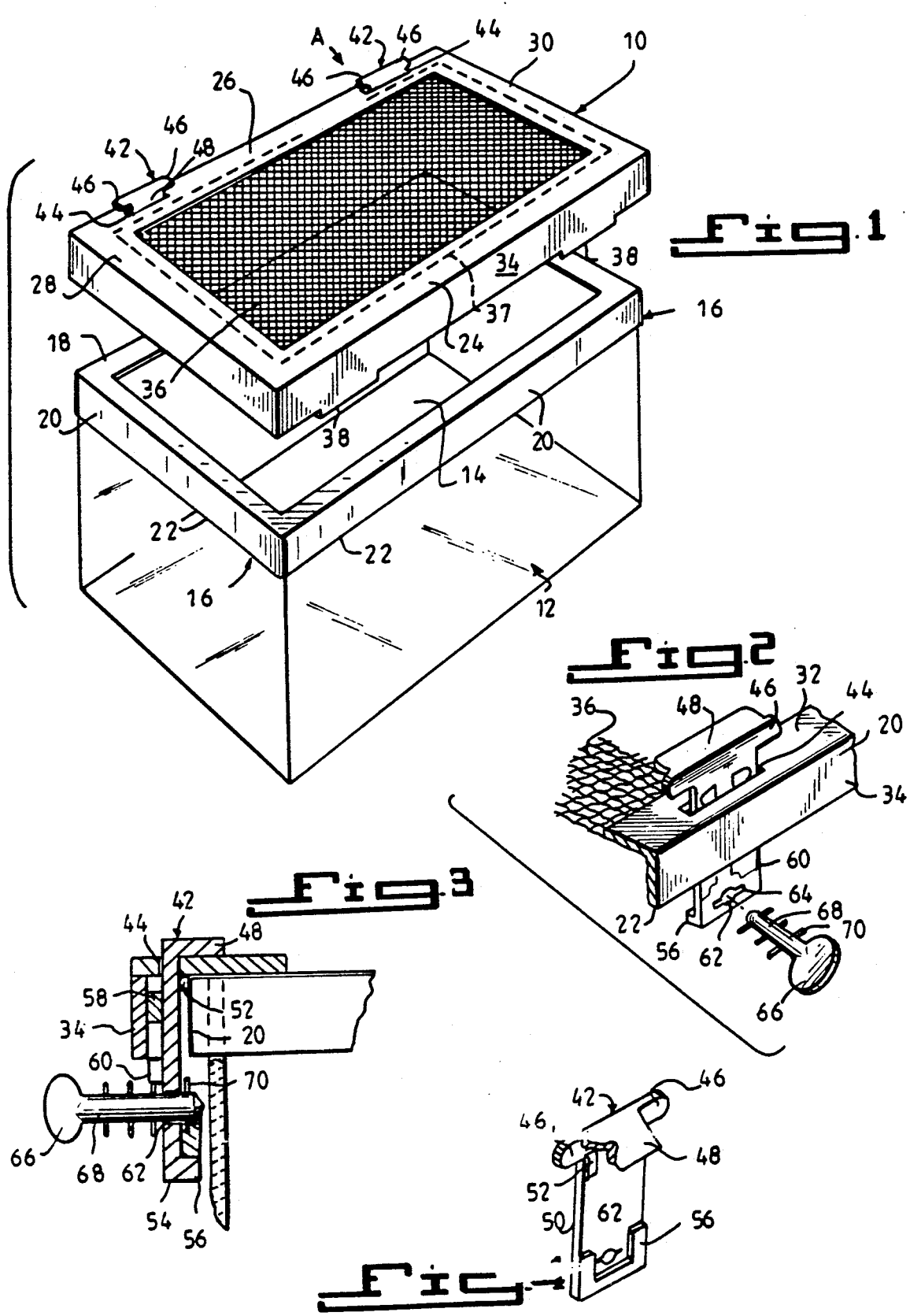

TAB FOR ANIMAL TANK COVER

BACKGROUND OF THE INVENTION

The present invention is directed to a cover for an animal tank or fish tank and particularly to a retaining clip therefor, allowing the cover to be easily installed over the tank and easily removed therefrom.

In my earlier patent, U.S. Pat. No. 4,576,115, as well as my copending applications, Ser. No. 393,575, filed Aug. 14, 1989, and Ser. No. 205,311, filed June 9, 1988, I have shown covers for animals, each comprising a peripheral frame, the cross section of which comprises a horizontal wall adapted to be positioned over the top of the tank and a vertical skirt wall adapted to fit loosely over the exterior lip of the tank. The frame is provided further with a plurality of retaining clips, certain ones of which depend fixedly from the vertical wall and certain others of which depend removably therefrom. These latter retaining clips are loosely and limitedly movable relative to the vertical wall by passing through an opening in the horizontal wall. The removable retaining clip is provided at its lower end with an inwardly extending shaped flange adpated to engage the outer surface of the tank to act in an opposing biasing relationship to the fixed retaining clips to resiliently secure the cover on the tank. A boss is located adjacent the upper edge of said body which is adapted to engage below the upper surface of the horizontal wall in engagement with the border of said tank. An upper shoulder is located on the rear surface of the body adapted to engage the vertical skirt wall of the frame, and a lower shoulder is provided on the rear surface of the body to engage below the lower edge of the vertical skirt wall of the frame, and an enlarged tab is provided along the lower portion of the front surface of the body. Key means passing through the body adjacent said enlarged tab is provided and is operable to removably engage the face of the tank, causing the body to flex and to secure the bosses and shoulders in engagement with said respective portions of the border and frame.

Further details of the present invention are set forth in the following description as well as in the accompanying drawings.

BRIEF DESCRIPTION OF THE DRAWINGS

In the drawings:

FIG. 1 is a perspective view, partially exploded of a tank provided with a cover and retaining clips in accordance with the invention;

FIG. 2 is a partial, sectional view in perspective of the tank and cover shown in FIG. 1 taken in the direction of the line indicated by the arrow A in FIG. 1 and illustrating the relationship of a removable retaining clip with the tank and cover;

FIG. 3 is a sectional view along line 3—3 of FIG.. 1; and

FIG. 4 is a front perspective view of the retaining clip according to the present invention.

DESCRIPTION OF THE PREFERRED EMBODIMENTS

Referring now more particularly to FIG. 1, a cover generally identified by numeral 10 is illustrated with an animal or fish tank, generally referred to by numeral 12, in the manner shown in my prior patents. Tank 12 is illustrated as a rectilinear parallelepiped having glass walls, although it may have any desirable peripheral shape, such as a square shape, or circular shape or the like. No matter what its particular shape may be, tank 12 is formed with an open top 14 and is provided around its periphery with a reinforcing border 16 which strengthens the open top. The border 16 may have an angular cross section providing a horizontal ledge 18 that generally overlies the top of the tank 12 and a vertical peripheral strip 20 extending a short distance downwardly along the side of the tank, thus reinforcing the tank 12 about its perimeter. The lower edge of the strip 20 forms a lip 22 spaced from the walls of the tank. The border 16 may be, if desired, provided only with the vertical strip 20.

Tank 12 may also be made of transparent plastic while border 16 may be made of a variety of materials, such as plastic, aluminum or other metals and the like, suitably adhered to the tank walls. When the border 16 is made of plastic, it can be molded about the glass or integrally formed with with the plastic tank walls or separately applied thereto. On the other hand, the upper edge of the tank walls may be thickened to provide an outwardly extending lip 22, at least along a substantial portion of a pair of oppositely disposed side walls, of the peripheral enclosure construction.

The cover 10 is rectangular comprising a frame conforming to the perimeter of the tank, having parallel front and rear sides 24 and 26, respectively, and orthogonally arranged lateral sides 28 and 30, respectively, all unitarily joined at their ends, each of the sides having a similar uniform cross section and comprising a horizontal wall 32 and a vertically depending skirt wall 34 (FIG. 2). A screen 36 is stretched horizontally across the frame and is permanently and integrally secured to the inner or under surface of the horizontal walls about the entire periphery of the frame. In practice, the frame is molded of plastic, and the screen 36 is heat-welded to it. The frame generally conforms dimemsionally loosely to the shape of the opening of tank 12 and is adapted to fit over the top 14 of the tank so that its horizontal walls 32 rest on the upper edge of the tank and its vertical skirt walls 34 depending over and slightly spaced from the side strips 20 of the border 16, thus closing the top of the tank.

The front edge 24 of the frame 23 is provided with a pair of fixed tabs 38 molded integrally and formed relatively vertical with the skirt wall 34, at the lower end of which is formed a horizontal inwardly directed flange 40. The tab 38 is of a length sufficient to enable the flange 40 to pass below the lip 22 to be out of contact with the side strips 20 or lip 22 when the cover is in place on the top of the tank, and to bear against the outer face of the tank 12.

Depending through the horizontal wall 32 of rear side 26 of the cover 10 and in opposition to the fixed tabs 38 are a pair of removable retaining clips 42. Each retaining clip 42 depends through a respective opening 44 formed in horizontal wall 32 of the frame on the interior side of skirt wall 34, thus being interposed between skirt wall 34 and the strip 20 of the border 16.

According to the present invention, the removable retaining clips 42 comprise a flat body portion having laterally extending wings 46 at its upper end in order to prevent the retaining clip from falling through slot 44, between which is formed an orthogonally directed head 48 adapted to extend inwardly over the horizontal wall 32.

Located on the inner surface of the retaining clip 42 (with respect to the frame itself) along each of the side edges 50 directly below the head 48 is a raised boss 52 and along its lowermost edge 54 is a U-shaped raised tab 56. On its exterior surface the retaining clip is provided with a pair of upper shoulders 58 below the level of the extended wings 46 and the bosses 52 and a pair of lower shoulders 60 above the level of the U-shaped tab 56. Situated between the arms of the U-shaped ledge 56 and just below the lower shoulders 60 is a horizontally disposed keyhole 62 having lateral slots 64 adapted to receive a key 66. The key 66 comprises an elongated rod 68 having spaced uniformly along its length a plurality of oppositely paired nail-like radial protrusions 70. Each pair of protrusions 70 are spaced from the adjacent pair at a distance equal to the thickness of the retaining clip 42, while the protrusions extend radially a distance equal to the slots 64. Thus, the key 66 can enter the keyhole 62 so that its front tip engages the glass wall 12 below the lip 22 of the band 20 and can be locked in place by rotating the key a half turn in either direction.

As will be seen from FIG. 4, when the retaining clip 42 is inserted in the opening 44, the bosses 52 on the inner face snap over the edge of the opening and engage with the edge so that the retaining clip seats squarely without rocking in the opening. The head 48 simultaneously sits over the top surface of the horizontal wall 32 and the upper shoulders 58 on the rear surface of the retaining clips 42 engage the top wall 32 of the frame completing seating of the retaining lip in the opening. These shoulders may also at times abut the inner surface of the vertical wall 34 of the frame.

Meanwhile, at the lower end the U-shaped ledge 56 snaps below the lip 22 of the border band 20, allowing the key 66 to be inserted in the hole 62 until its tip engages the glass, and the key is locked. The locking of the key flexes the retaining clip 42 outwardly away from the glass 12 so that the lower shoulders 60 lodge below the lower edge of the vertical wall 34. In this manner the retaining clip is locked in place and the cover 10 prevented from being dislodged.

This construction has several other advantages—namely, the retaining clip is securely fastened to the frame of the cover so that if the cover is removed from the tank, the retaining clip 42 remains fixed to the frame by virtue of the cooperation of the boss 52 and the upper shoulders 56 on the edge of the opening 44; the cover may thus be removed, not by removing the retaining clips 42 but by flexing the front vertical wall 34 of the frame, releasing the retaining clips 38 from engagement; and because the retaining clips 42 are not removed and because the key 66 is not removed either, the cover may be more easily replaced by merely snapping the cover in place after distending the fixed retaining clips 38. A fourth additional advantage lies in the fact that variations in dimension between several styles of tanks can be accommodated by the single form of retaining clip 42. Adjustement within an inch or two can be made by merely choosing the size of the key 66 as its length may also be varied by the depth in which it is inserted in the keyhole. Still another advantage lies in the fact that removal of the key is no easy, thus preventing accidental removal of the cover, for instance by children. Another advantage lies in the fact that fewer retaining clips 42 will be lost when the cover is, in fact, removed.

It will be seen that in each embodiment the cover is held on the tank by the resilient opposing forces of the retaining clips (both fixed and removable) established by providing the removable retaining clips with sufficient spring action against the edges of the opening through which they pass and the action of the key against the glass. It will also be observed that the lower shoulder of the retaining clips extend below the lip of the band and do not normally engage the lip. This permits the cover a certain degree of vertical movement. However, because of the pressure of the retaining clips the movement of the cover is restricted once the retaining clips are lifted into contact with the lip. It is to be further observed that the removable retaining clips are biased, i.e. the spring action created, by the cooperation of the body portion against the skirt of the frame and the bearing of the flange on the tank.

On the other hand, due to the unique construction of the cover, it can be removed with ease when desired. The fixed retaining clips 38, formed along the front edge of the cover 10, are resilient and flex along their lengths. Thus, they can be manually pulled in the direction of arrow B, as shown in FIG. 5, so that their flanges 40 can be moved away from tank wall 41 and the entire cover can be tilted rearwardly to displace the removable retaining clips 42 which bear against tank wall 12b. Thus, cover 10 can be removed from and returned quickly to the tank simply by flexing the fixed retaining clips 38. The cover may similarly be removed by displacing the removable retaining clips from the rear and tilting forwardly.

Similarly, the cover may be returned to its fixed position on the tank 12 by reversing the operation, i.e. by placing the retaining clips 42 in engagement over the lip 22 and closing the cover in a typical downward motion such as if it were a hinged lid. The retaining clips 38 along the front border of the frame and the frame itself being resilient ride over the border 16 along the front of the tank until the flanges 40 are in place against tank wall 12a.

Various changes, modifications and embodiments have been shown and described; others will be known to those skilled in the art. Accordingly, it is intended that the foregoing description be taken as illustrative of the present invention and not limiting of the same.

What is claimed is:

1. In combination with a cover for an animal tank, fish tank, or the like, the tank defining a peripheral enclosure having an open top provided with a border having an exterior lip, said cover comprising a continuous frame, the cross section of which comprises a horizontal wall adapted to be positioned over the top of said tank and a vertical skirt wall adapted to fit loosely about the exterior lip of the border, said frame having a plurality of retaining clips depending therefrom, certain ones of said retaining clips depending fixedly from the vertical skirt of said frame on one side of said frame to engage the tank enclosure beneath said exterior lip and certain others of said retaining clips being separately removable, said removable retaining clips being located in respective slot openings in the horizontal wall of said frame opposite to the side of said frame having the fixed retaining clips, said removable retaining clips depending freely and loosely through said openings below the lip, each of said retaining clips being formed of a planar body having front and rear surfaces provided with laterally extending projections at its upper end to prevent said retaining clips from passing through the openings, a boss located adjacent the upper edge of said body adapted to engage below the upper surface of the horizontal wall in engagement with the border of said tank, an upper shoulder located on the rear surface of the body adapted to engage the vertical skirt wall of the frame and a lower shoulder on the rear surface of the body to engage below the lower edge of the vertical skirt wall of the frame, an enlarged tab along the lower portion of the front surface of the body, and key means passing through said body adjacent said enlarged tab being operable to removably engage the face of the tank, said key means causing said body to flex on engagement of said key with said glass to secure said bosses and shoulders in engagement with said respective portions of said border and frame,.

2. The combination according to claim 1, including a pair of laterally extending projections at the upper end of said body, each of said projections being arranged adjacent a lateral edge of said body, said retaining clip including a pair of upper and a pair of lower shoulders, each of said shoulders in each pair being arranged adjacent a lateral edge of said body on the rear surface thereof.

3. The combination according to claim 2, wherein said enlarged tab is U-shaped and is arranged along the bottom and lateral side edges of said body below said key.

4. The combination according to claim 1, wherein said removable retaining clips are provided with a shelf-like head at their upper end extending over the horizontal wall of said frame.

5. The combination according to claim 1, wherein said body includes a shaped keyhole and a key having radially projecting prongs spaced uniformly along the length of the key and enterable into said keyhole and securable therein by rotating said key to allow the prongs to engage the inner surface of said body.

6. The combination according to claim 1, wherein the fixedly depending retaining clips are integrally formed with the frame and are sufficiently flexible so as to be manually releasable from engagement beneath the lip of the tank allowing removal of said cover without removing said other retaining clips.

* * * * *